(12) United States Patent
Lee et al.

(10) Patent No.: US 11,472,253 B2
(45) Date of Patent: Oct. 18, 2022

(54) HVAC SYSTEM FOR VEHICLE

(71) Applicants: Hyundai Motor Company, Seoul (KR); Kia Motors Corporation, Seoul (KR); Duck Yang Industry Co., Ltd., Ulsan (KR)

(72) Inventors: Jae-Seung Lee, Hwaseong-Si (KR); Kwang-Seub Kim, Daejeon (KR)

(73) Assignees: Hyundai Motor Company, Seoul (KR); Kia Motors Corporation, Seoul (KR); Duck Yang Industry Co., Ltd., Ulsan (KR)

( * ) Notice: Subject to any disclaimer, the term of this patent is extended or adjusted under 35 U.S.C. 154(b) by 273 days.

(21) Appl. No.: 16/856,870

(22) Filed: Apr. 23, 2020

(65) Prior Publication Data
US 2021/0206226 A1 Jul. 8, 2021

(30) Foreign Application Priority Data
Jan. 3, 2020 (KR) .................. 10-2020-0000729

(51) Int. Cl.
*B60H 1/00* (2006.01)
*B60H 1/26* (2006.01)

(52) U.S. Cl.
CPC ..... *B60H 1/00021* (2013.01); *B60H 1/00564* (2013.01); *B60H 1/265* (2013.01); *B60H 2001/00128* (2013.01); *B60H 2001/00221* (2013.01)

(58) Field of Classification Search
CPC B60H 1/00021; B60H 1/00564; B60H 1/265; B60H 1/00392; B60H 1/2225; B60H 1/2215; H05B 3/20; H05B 2214/04; F24H 3/0435; F24H 9/1872; F24H 2250/04
See application file for complete search history.

(56) References Cited

U.S. PATENT DOCUMENTS

| | | | |
|---|---|---|---|
| 7,667,164 B2* | 2/2010 | Bohlender | F24H 3/0476 219/505 |
| 10,549,604 B2* | 2/2020 | Min | H05B 1/02 |
| 2002/0000314 A1* | 1/2002 | Danieau | B60H 1/00985 165/203 |
| 2009/0194525 A1* | 8/2009 | Lee | H05B 3/145 219/553 |
| 2011/0067436 A1* | 3/2011 | Lee | F24D 12/02 62/513 |
| 2011/0127247 A1* | 6/2011 | Choi | H05B 3/50 219/202 |
| 2014/0209269 A1* | 7/2014 | Goenka | B60H 1/32281 165/42 |

(Continued)

FOREIGN PATENT DOCUMENTS

KR 10-2014-0066806 A 6/2014
KR 10-1436960 B1 9/2014

*Primary Examiner* — Emmanuel E Duke
(74) *Attorney, Agent, or Firm* — Morgan, Lewis & Bockius LLP

(57) ABSTRACT

A heating, ventilation, and air conditioning (HVAC) system for a vehicle may include a heating body positioned inside an HVAC duct of the vehicle, formed between a first electrode portion and a second electrode portion having polarities opposite to each other. The heating body is configured to generate heat when the heating body is electrified to increase a temperature of an air being transported through the HVAC duct.

20 Claims, 6 Drawing Sheets

(56) References Cited

U.S. PATENT DOCUMENTS

| | | | |
|---|---|---|---|
| 2015/0043898 A1* | 2/2015 | Gu | B60H 1/2225 |
| | | | 392/360 |
| 2015/0197136 A1* | 7/2015 | Chen | B60H 1/246 |
| | | | 62/3.61 |
| 2017/0267065 A1* | 9/2017 | Kim | B60H 1/242 |
| 2018/0037084 A1* | 2/2018 | Shibayama | B60H 1/00835 |
| 2019/0248210 A1* | 8/2019 | Pierron | F24H 3/0441 |
| 2019/0359026 A1* | 11/2019 | Salazar | B60H 1/2225 |

* cited by examiner

HVAC SYSTEM FOR VEHICLE

CROSS-REFERENCE TO RELATED APPLICATION(S)

The present application claims priority to Korean Patent Application No. 10-2020-0000729, filed on Jan. 3, 2020, the entire contents of which is incorporated herein for all purposes by this reference.

BACKGROUND OF THE INVENTION

Field of the Invention

The present invention relates to a heating, ventilating and air conditioning (HVAC) system for a vehicle, and more particularly, to a heating, ventilation, and air conditioning (HVAC) system for a vehicle positioned on a vehicle HVAC duct.

Description of Related Art

A vehicle is provided with an HVAC system for passenger's comfortable boarding on a vehicle.

The HVAC system may include a heater for increasing the indoor temperature of the vehicle in addition to an air conditioner for reducing the indoor temperature of the vehicle.

In the case of the vehicle provided with an internal combustion engine, during the driving of the vehicle, except for a case where cooling is performed in the vehicle, only air blowing using heat generated from the engine is sufficient to achieve the function of the heater as described above.

However, in contrast with the internal combustion engine, an electric vehicle is not provided with an engine which may be used as a heat source.

Accordingly, the electric vehicle is provided with a separate PTC heater for a heating function.

The PTC heater is a heating device using an electrical energy, and thus has the problem of large electricity consumption to cause large energy consumption in the electric vehicle.

Accordingly, in the case of the electric vehicle, it is very important to minimize the energy consumption for the HVAC.

In spite of this, the existing PTC heater has been simply applied, so that the air heated by the heat generated by the PTC heater is blown to the interior of the vehicle through the air blowing using a blower.

However, in the process in which the heated air is blown along a duct, the temperature of the air becomes lowered as the air becomes far apart from the PTC heater, and as a result, the thermal energy of the air being finally sent from a duct discharge port is greatly lost.

According to the related art as described above, as the length of the duct becomes longer, a much more amount of thermal energy is to be lost.

Furthermore, with the development of the electric vehicle technology, a complete autonomous driving will become possible even without driver's direct driving operation, and in the instant case, a driver's seat will be able to be rotated to face a rear seat in the indoor space of the vehicle.

In such a case, the existing HVAC duct discharge port provided in front of the dashboard may be blocked by the backside of the driver's seat, and thus it may be inevitable to apply a separate discharge port.

In other words, it will be necessary to diversify the position of the existing HVAC duct discharge port.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to presenting a passenger a more comfortable temperature condition in an energy saving manner by providing a heating body inside a heating, ventilation, and air conditioning (HVAC) duct and supplementing the decrement of thermal energy of an air finally passing through an HVAC duct discharge port regardless of the length of the HVAC duct.

Other various aspects of the present invention may be understood by the following description, and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In one aspect of the present invention to solve the above-described problems, an HVAC system for a vehicle includes a heating body positioned inside an HVAC duct of the vehicle, formed between a first electrode portion and a second electrode portion having polarities opposite to each other, and configured to generate heat when the heating body is electrified to increase a temperature of an air being transported through the HVAC duct.

The heating body is positioned at a discharge port of the HVAC duct.

The heating body is a CNT heating body.

The CNT heating body includes a plurality of rib portions formed spaced from one another at specific intervals between the first electrode portion and the second electrode portion.

At least one of the plurality of rib portions is formed to have a length which is different from the length of another of the plurality of rib parts.

The rib portions are formed in parallel to an air blowing direction of the HVAC duct.

The HVAC duct includes a door trim HVAC duct positioned at a door trim of the vehicle, and the CNT heating body is positioned on the door trim HVAC duct.

The discharge port of the door trim HVAC duct is formed toward a bottom surface of the vehicle.

The HVAC duct includes a rear seat HVAC duct for air blowing to a rear seat of the vehicle, and the CNT heating body is positioned on the rear seat HVAC duct.

The rear seat HVAC duct is configured to communicate with a B pillar of the vehicle.

The discharge port of the rear seat HVAC duct is positioned at an upper end portion of the B pillar.

The discharge port of the rear seat HVAC duct is formed in a side surface direction toward an interior of a cabin of the vehicle.

The CNT heating body is integrally formed with the HVAC duct during forming of the HVAC duct.

According to an exemplary embodiment of the present invention as described above, the following effects may be obtained.

First, because the heating body is provided inside the HVAC duct, and the decrement of the thermal energy of the air finally passing through the HVAC duct discharge port is supplemented regardless of the length of the HVAC duct, the thermal energy heating efficiency may be maximized.

Second, more comfortable temperature conditions may be presented to the passenger.

Third, because the air is discharged in the side surface direction toward the passenger space of the vehicle through the B pillar, the temperature conditions inside the vehicle may be controlled more stably.

The methods and apparatuses of the present invention have other features and advantages which will be apparent from or are set forth in more detail in the accompanying drawings, which are incorporated herein, and the following Detailed Description, which together serve to explain certain principles of the present invention.

It is to be understood that both the foregoing general description and the following detailed description of the present invention are exemplary and explanatory and are intended to provide further explanation of the present invention as claimed.

Figure 1:
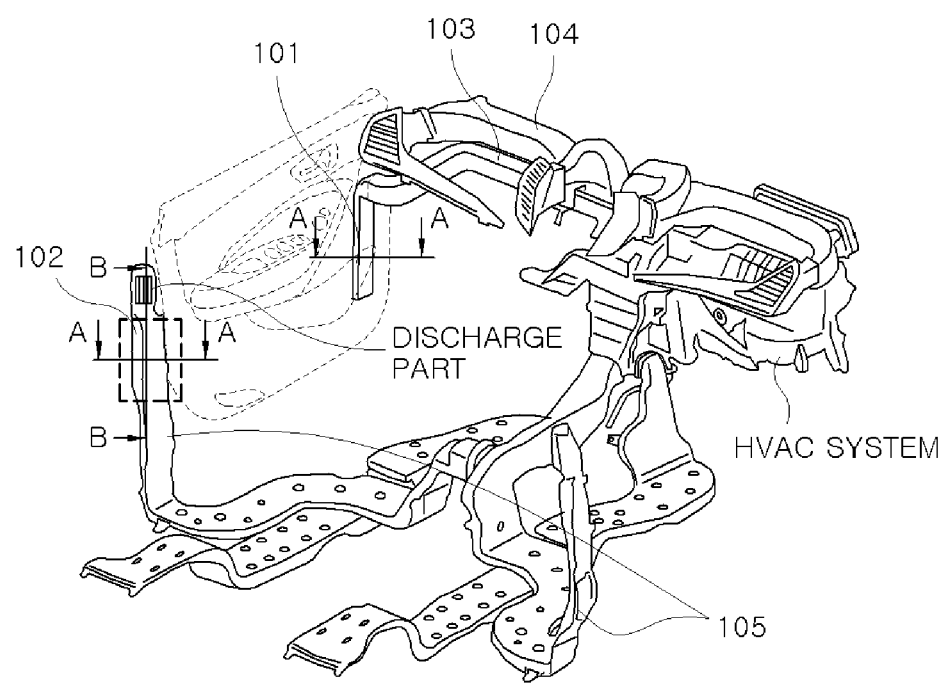
FIG. 1 is a view illustrating an HVAC duct formed in a passenger space of an electric vehicle according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail with reference to the accompanying drawings. However, it should be understood that the present invention is not limited to the specific embodiments described hereinafter, but includes various modifications, equivalents, and alternatives of the exemplary embodiments of the present invention.

In the explanation of respective drawings, similar reference numerals are used for similar constituent elements.

Although the terms "first, second, and so forth" are used to describe various constituent elements, such constituent elements should not be limited by the terms. The terms are used only to discriminate a constituent element from other constituent elements.

For example, without departing from the scope of the present invention, a first element may be called a second element, and the second element may also be called the first element in a similar manner. The term "and/or" may include all possible combinations of items that are enumerated together.

Unless differently defined, all terms used herein, including technical or scientific terms, have the same meanings as those that are generally understood by a person of ordinary skill in the art to which an exemplary embodiment of the present invention pertains.

It should be construed that the terms as defined in generally used dictionaries have meanings that coincide with the meanings in context of related technologies, and unless clearly defined in the description, the terms should not be construed as ideal or overly formal meanings.

A vehicle may be provided with a heating, ventilation, and air conditioning (HVAC) system as illustrated in FIG. 1, and in a passenger space, a front seat HVAC duct 104, a door trim HVAC duct 103, and a rear seat HVAC duct 105 for guiding blowing of an air being provided from the HVAC system may be provided.

Hereinafter, explanation will be made based on A-A cross-section (hereinafter, referred to as "duct lateral cross-section") and B-B cross-section (hereinafter, referred to as "duct longitudinal cross-section") of FIG. 1.

In a passenger space of an electric vehicle according to an exemplary embodiment of the present invention, CNT heating bodies may be provided inside the door trim HVAC duct 103 and the rear seat HVAC duct 105, respectively.

In other words, a first CNT heating body 101 may be positioned adjacent to the discharge port side in the door trim HVAC duct 103, and a second CNT heating body 102 may be positioned adjacent to the discharge port side in the rear seat HVAC duct 105.

The vehicle HVAC system includes a blower and a PTC heater, which are fluid-communicably connected to the HVAC duct.

The heating body is positioned inside the HVAC duct, includes electrode portions having opposite polarities to each other, and generates heat when being electrified to heat the air blown through the HVAC duct.

In the instant case, it may be preferable that the heating body is positioned adjacent to the discharge port side of the HVAC duct.

Accordingly, the air blown from the interior of the HVAC duct is cooled with its temperature reduced as the air flows to be closer to the discharge port, but the temperature of the blown air is increased again by the CNT heating body positioned adjacent to the discharge port side, and thus the air with the originally desired temperature can finally be discharged through the discharge port.

Meanwhile, it may be preferable that the heating body is the CNT heating body.

Figure 5:
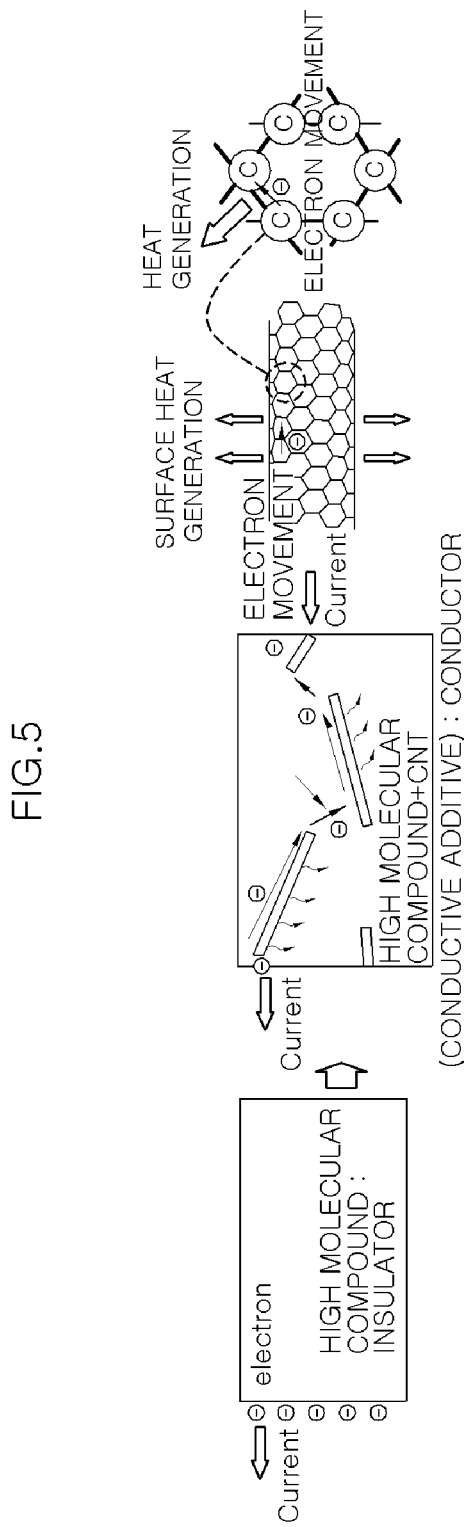
FIG. 5 is a schematic diagram explaining the heating principle of a CNT composite material (mixture) according to an exemplary embodiment of the present invention.
Figure 6:
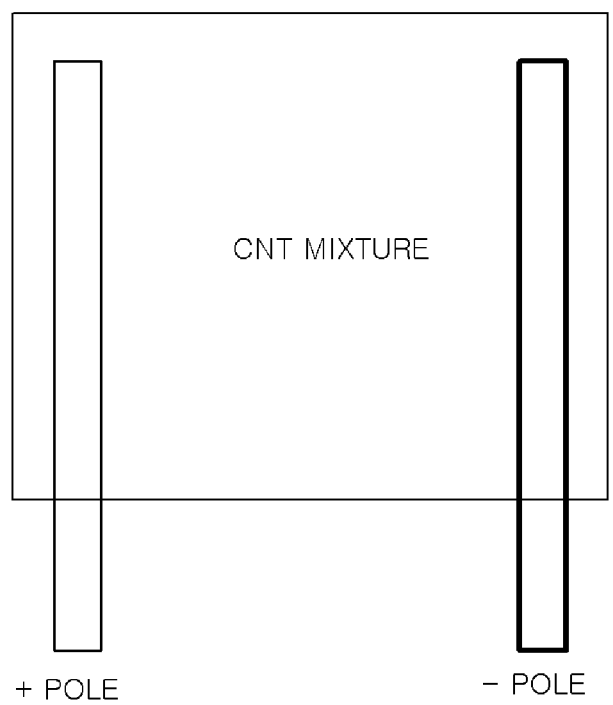
FIG. 6 is a diagram illustrating an electrode configuration of a CNT composite material (mixture) according to an exemplary embodiment of the present invention.

Referring to FIG. 5 and FIG. 6, the CNT heating body is a component provided with electrodes composed of CNT mixtures and configured to generate heat by itself when being electrified.

The CNT heating body is obtained by combining the CNT which is a conductive additive with a high molecular compound, and has a property of a conductor.

According to the principle, if electricity is applied to the CNT heating body, heat is generated in a process of electron movement.

A plurality of rib portions are formed spaced from one another at specific intervals.

It may be preferable that at least one of the plurality of rib portions is formed to have a length which is different from the length of another of the plurality of rib parts.

On a duct lateral cross-section, the air blowing direction may be a direction penetrating into or out of the surface.

The HVAC system for a vehicle according to an exemplary embodiment of the present invention includes the heating body positioned inside the HVAC duct.

The HVAC system includes the blower and the PTC heater, which are fluid-communicably connected to the HVAC duct.

In the instant case, it may be preferable that the heating body is the CNT heating body 100.

The heating body includes the first electrode portion 301 and the second electrode portion 302, which have polarities opposite to each other.

That is, the CNT heating body 100 may include a plurality of rib portions formed spaced from one another at specific intervals between the first electrode portion 301 and the second electrode portion 302.

In the instant case, the rib portions may be formed of the CNT heating body 100.

Accordingly, the CNT heating body 100 formed between the first electrode portion 301 and the second electrode portion 302 generates heat when being electrified to increase the temperature of the air being transported in the HVAC duct.

Meanwhile, it may be preferable that the heating body is positioned on the discharge port side of the HVAC duct.

Furthermore, the first electrode portion 301 and the second electrode portion 302 may also be positioned on an internal wall of the HVAC duct.

It may be preferable that the rib portions are formed in parallel to the air blowing direction of the HVAC duct.

Meanwhile, it may be preferable that at least one of the plurality of rib portions is formed to have a length which is different from the length of another of the plurality of rib parts.

Figure 2:
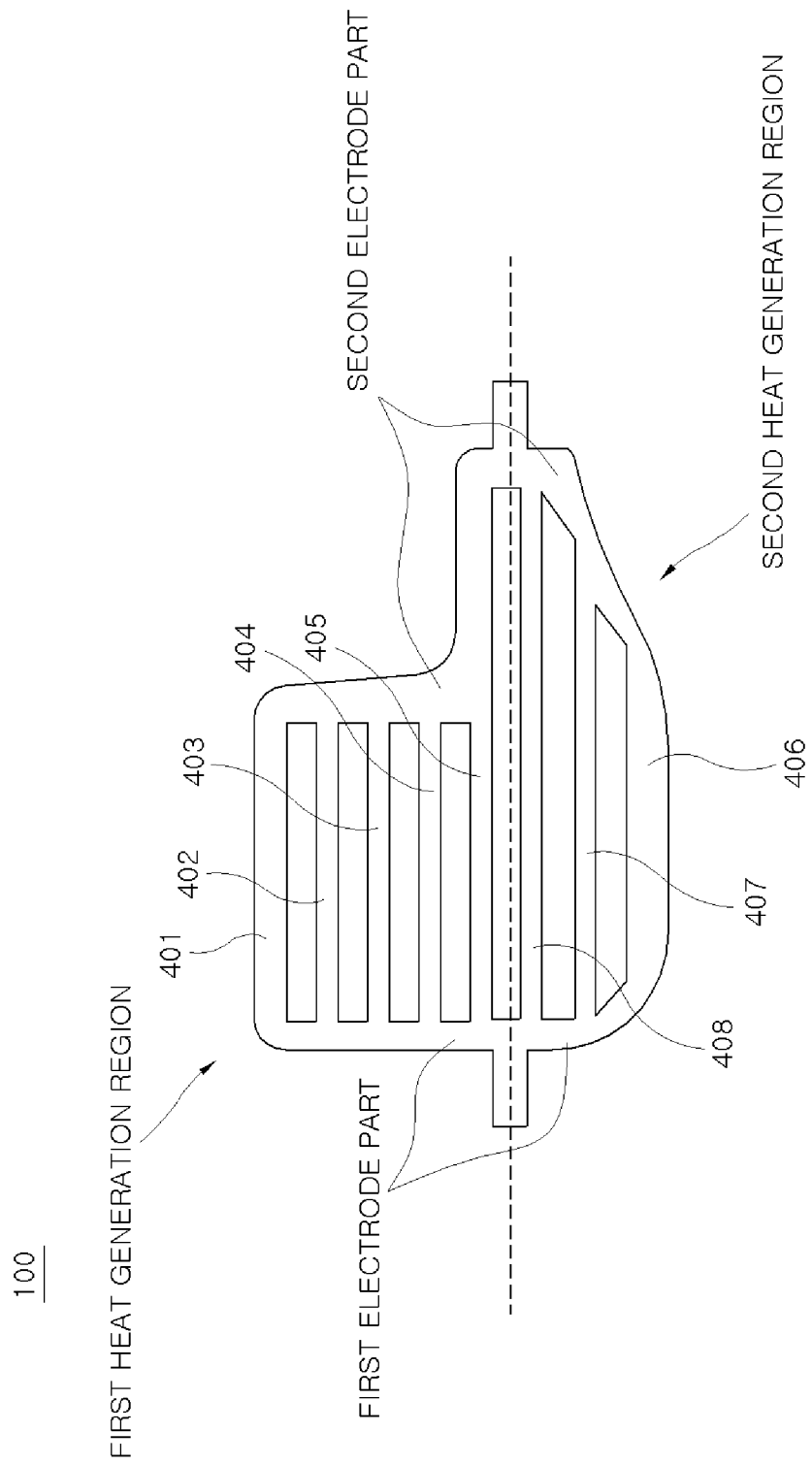
FIG. 2 is a lateral cross-sectional view of a Carbon Nano Tube (CNT) heating body according to an exemplary embodiment of the present invention.

As illustrated in FIG. 2, a first rib portion 401, a second rib portion 402, a third rib portion 403, a fourth rib portion 404, and a fifth rib portion 405 may be formed to having the same length.

A region formed by the first rib portion 401, the second rib portion 402, the third rib portion 403, the fourth rib portion 404, and the fifth rib portion 405 is just a first heat generation region 201.

Meanwhile, a second heat generation region 202 is a region formed by a sixth rib portion 406, a seventh rib portion 407, and an eighth rib portion 408.

The overall shape of the second heat generation region 202 may not be a rectangle.

In other words, the shape of the second heat generation region 202 may be a trapezoid as a whole caused by the shape of the second electrode portion 302.

The second heat generation region 202 may be deployed toward the indoor side of the vehicle, and the first heat generation region 201 may be deployed toward the external side of the vehicle.

Among the plurality of rib parts, the eighth rib portion 408 is formed to have the longest length.

Meanwhile, the distance between the first rib portion 401 and the sixth rib portion 406 is set to be longer than the distance of another pair of the plurality of rib parts.

In other words, the first rib portion 401 and the sixth rib portion 406 form the outermost contour of the CNT heating body 100.

If current is applied to the first electrode portion 301 and the second electrode portion 302, the first rib portion 401, the second rib portion 402, the third rib portion 403, the fourth rib portion 404, the fifth rib portion 405, the sixth rib portion 406, the seventh rib portion 407, and the eighth rib portion 408 generate heat.

In the instant case, the air having passed through the CNT heating body 100 has an increased temperature as passing through a space between the first rib portion 401 and the second rib portion 402, a space between the second rib portion 402 and the third rib portion 403, a space between the third rib portion 403 and the fourth rib portion 404, a space between the fourth rib portion 404 and the fifth rib portion 405, a space between the fifth rib portion 405 and the sixth rib portion 406, a space between the sixth rib portion 406 and the seventh rib portion 407, and a space between the seventh rib portion 407 and the eighth rib portion 408.

It may be preferable that the HVAC duct includes the door trim HVAC duct 103 positioned on the door trim of the vehicle, and the CNT heating body is positioned in the door trim HVAC duct 103.

Meanwhile, it may be preferable that the discharge port of the door trim HVAC duct 103 is formed toward the bottom surface of the vehicle.

Furthermore, it may be preferable that the HVAC duct includes the rear seat HVAC duct 105 for air blowing to the rear seat of the vehicle, and the CNT heating body 100 is positioned in the rear seat HVAC duct.

In the instant case, it may be preferable that the rear seat HVAC duct 105 communicates with the B pillar of the vehicle.

Figure 3:
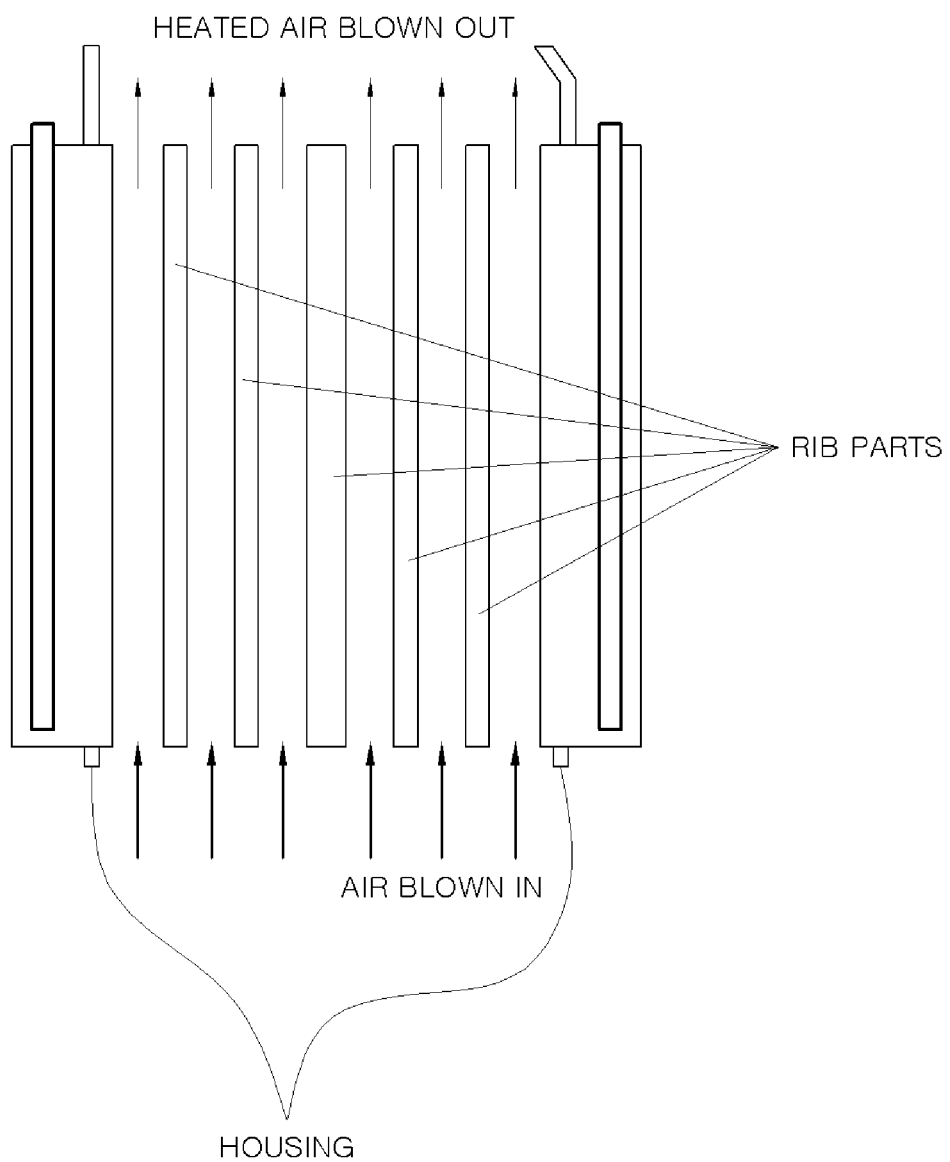
FIG. 3 is a longitudinal cross-sectional view of a CNT heating body according to an exemplary embodiment of the present invention.

The second CNT heating body 102 is positioned adjacent to the discharge port of the rear seat HVAC duct 105, and shows the shape as illustrated in FIG. 3 as seen on the duct longitudinal cross-section B-B.

The B pillar is positioned between front seats (driver's seat and passenger seat) and rear seats (seats excluding the driver's seat and the passenger seat) in the passenger space.

In the instant case, it may be preferable that the discharge port of the rear seat HVAC duct 105 is positioned at an upper end portion of the B pillar.

Furthermore, it may be more preferable that the discharge port of the rear seat HVAC duct 105 is formed in a side surface direction toward the interior of a cabin of the vehicle.

Meanwhile, it may be preferable that the CNT heating body 100 is integrally formed with the HVAC duct during the forming of the HVAC duct.

The duct longitudinal cross-section is formed long in the vertical direction thereof, and thus when the air passes through the rear seat HVAC duct 105, heat exchange between the transported air and the CNT heating body 100 may be smoothly performed.

Furthermore, because the heated air has the property of rising upwards, and the shape of the duct longitudinal cross-section of the second CNT heating body 102 rises and passes through a gap of a slit structure in the vertical direction thereof, it is possible to provide a desired discharge force from the blower to the farthest discharge port without losing the force of transporting the air into the indoor space of the vehicle.

Figure 4:
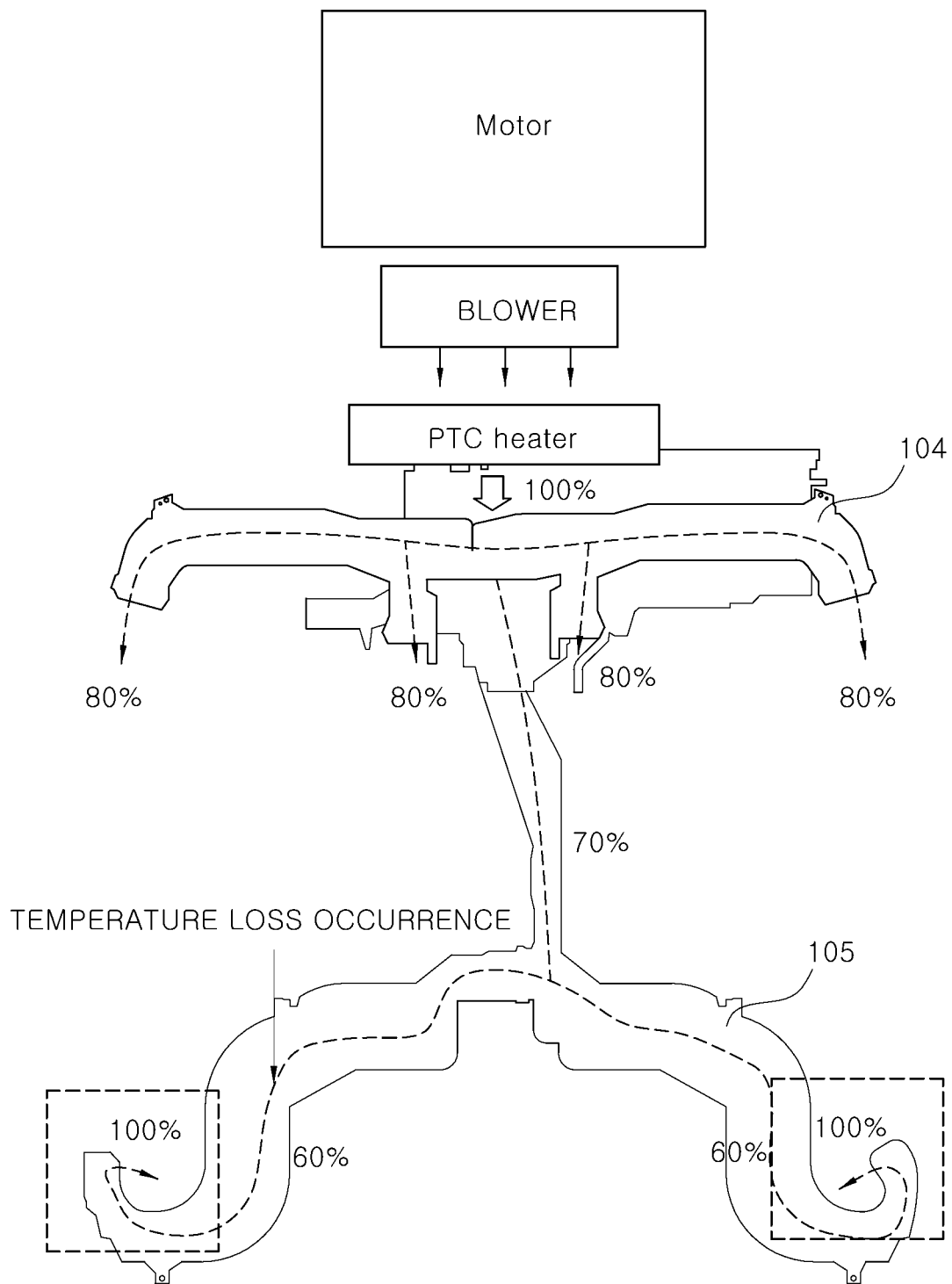
FIG. 4 is a schematic diagram explaining HVAC efficiency according to an exemplary embodiment of the present invention.

According to an exemplary embodiment of the present invention as described above, it may be confirmed that the heat transfer efficiency of 60% is finally improved to 100% on the discharge port side of the rear seat HVAC duct 105 as illustrated in FIG. 4.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heating, ventilation, and air conditioning (HVAC) system for a vehicle, the HVAC system comprising:
    a heating body positioned inside an HVAC duct of the vehicle, formed between a first electrode portion and a second electrode portion having polarities opposite to each other wherein the heating body includes a first heat generation region and a second heat generation region which are configured to generate heat when the heating body is electrified to increase a temperature of an air being transported through the HVAC duct,
    wherein each of the first heat generation region and the second heat generation region includes a plurality of rib portions connected to the first electrode portion and the second electrode portion, and
    wherein the plurality of rib portions in the first heat generation region has a same length to each other and the plurality of rib portions in the second heat generation region has a different length to each other.

2. The HVAC system of claim 1, wherein the heating body is positioned at a discharge port of the HVAC duct.

3. The HVAC system of claim 1, wherein the heating body is a carbon nano tube (CNT) heating body.

4. The HVAC system of claim 3, wherein the plurality of rib portions are spaced from one another at predetermined intervals between the first electrode portion and the second electrode portion.

5. The HVAC system of claim 4, wherein one of the plurality of rib portions in the second heat generation region is formed to have a longest length among the plurality of rib portions.

6. The HVAC system of claim 5, wherein the one of the plurality of rib portions is positioned between an uppermost rib portion and a lowermost rib portion among the plurality of rib portions.

7. The HVAC system of claim 3,
    wherein the HVAC duct includes a door trim HVAC duct positioned at a door trim of the vehicle, and
    wherein the CNT heating body is positioned on the door trim HVAC duct.

8. The HVAC system of claim 7, wherein a discharge port of the door trim HVAC duct is formed toward a bottom surface of the vehicle.

9. The HVAC system of claim 3,
    wherein the HVAC duct includes a rear seat HVAC duct for air blowing to a rear seat of the vehicle, and
    wherein the CNT heating body is positioned on the rear seat HVAC duct.

10. The HVAC system of claim 9, wherein the rear seat HVAC duct is configured to communicate with a B pillar of the vehicle.

11. The HVAC system of claim 10, wherein a discharge port of the rear seat HVAC duct is positioned at an upper end portion of the B pillar.

12. The HVAC system of claim 11, wherein the discharge port of the rear seat HVAC duct is formed in a side surface direction toward an interior of a cabin of the vehicle.

13. The HVAC system of claim 3, wherein the CNT heating body is integrally formed with the HVAC duct during forming of the HVAC duct.

14. The HVAC system of claim 1, wherein the plurality of rib portions is formed in parallel to an air blowing direction of the HVAC duct.

15. The HVAC system of claim 1, wherein the first electrode portion and the second electrode portion are positioned on an internal wall of the HVAC duct.

16. The HVAC system of claim 1, wherein the first heat generation region is in a shape of a rectangle.

17. The HVAC system of claim 16, wherein the second heat generation region is in a shape of a trapezoid.

18. The HVAC system of claim 17, wherein the first heat generation region is deployed toward an external side of the vehicle.

19. The HVAC system of claim 18, wherein the second heat generation region is deployed toward an indoor side of the vehicle.

20. The HVAC system of claim 1, wherein the second heat generation region is in a shape of a trapezoid.

* * * * *